United States Patent [19]

Hellwarth

[11] 3,840,891

[45] Oct. 8, 1974

[54] TIME DURATION MODULATION AND DEMODULATION FOR STORAGE OR TRANSMISSION OF DIGITAL DATA

[75] Inventor: George A. Hellwarth, Deerfield Beach, Fla.

[73] Assignee: International Business Machines Corporation, Armonk, N.Y.

[22] Filed: Dec. 27, 1972

[21] Appl. No.: 319,083

[52] U.S. Cl. .................... 360/40
[51] Int. Cl. .................... G11b 5/02
[58] Field of Search .................... 360/39, 40

[56] References Cited

UNITED STATES PATENTS

| | | | |
|---|---|---|---|
| 2,887,674 | 5/1959 | Greene | 340/174.1 |
| 3,195,118 | 7/1965 | St. Clair | 360/51 |
| 3,218,618 | 11/1965 | Warren | 340/174.1 G |
| 3,427,605 | 2/1969 | Gabor | 340/174.1 |
| 3,514,773 | 5/1970 | Damon, Jr. | 260/18 |
| 3,573,766 | 4/1971 | Perkins, Jr. | 340/174.1 |
| 3,623,039 | 11/1971 | Barham | 360/48 |
| 3,750,121 | 7/1973 | Lee | 340/174.1 |
| 3,778,787 | 12/1973 | Cannon | 340/174.1 |

OTHER PUBLICATIONS

"Data Transmission" by Bennett and Davy – McGraw–Hill Book Co. (pp. 268–276).

*Primary Examiner*—Vincent P. Canney
*Attorney, Agent, or Firm*—Earl C. Hancock; Carl W. Laumann, Jr.; J. Jancin, Jr.

[57] ABSTRACT

Digital data is converted into a composite time duration and amplitude modulated self-clocking waveform for communication through or storage on a linear but noisy band pass media. Zero crossings within the waveform contain clock and data significance and are logically interpreted to reconstruct the stored or transmitted data. Noise rejection is enhanced by preceding and/or following data/clock significant zero crossings in the stored or transmitted waveform with a "no data" pattern of zero crossing transition at a frequency distinct from the clock/data frequencies.

11 Claims, 9 Drawing Figures

TIME DURATION MODULATION AND DEMODULATION FOR STORAGE OR TRANSMISSION OF DIGITAL DATA

BACKGROUND OF THE INVENTION

1. Field of the Invention

This invention relates to methods and apparatus for recording or transmitting digital information on or through a linear noisy band pass media. More particularly, the present invention relates to digital data handling wherein zero crossing transitions in a waveform represent clock and/or data signals which must pass through or be stored upon a medium which has frequency response characteristics which tend to interfere with or destroy the significance of those transitions.

The present invention is particularly useful for permitting data processing techniques to be applied so that digital information can be recovered from or through a noisy band pass limited medium. For instance, this invention permits recording of digital information upon state-of-the-art audio recorders and recording tape without substantial modification to either the recorder or the tape. Yet another application of this invention is to the reliable transmission of digital data over a media which has a limited band pass characteristic such as certain telecommunication lines or facilities. The invention can be implemented in conjunction with binary data encoded in time-duration modulation, frequency modulation, frequency shift keying, phase modulation or phase shift keying formats.

2. Description of the Prior Art

Time-duration modulation (TDM) to be described in this invention consists of an improvement over the prior art of conventional frequency modulation (FM) or frequency-shift keying (FSK), or over phase modulation (PM) or phase-shift keying (PSK). These modulations are used for converting the bandwidth of data signals from a low-pass spectrum to a band-pass spectrum without loss of information. The purpose for modulating data to produce a band-pass signal is to store or to transmit the data on a medium whose bandwidth is inherently band-pass limited. For example, out-of-contact magnetic tape and disc storage equipment exhibit a combined record-playback usable response limited to between two and four octaves of bandwidth. Magnetic media with heads in direct contact extend the equalized combined record-playback response to from seven to 10 octaves of bandwidth. Common-carrier communications lines are limited to two or three octaves of usable transmission bandwidth. Unloaded cable communications links are limited to about three to six octaves of usable transmission bandwidth. In each case, both attenuated or varying amplitude response and increasing signal delay (the frequency derivative of phase) determine the usable limits of bandwidth at both the high and low frequency band edges relative to the response at the band center.

Recently developed high-performance modulation techniques such as "digital echo modulation" employ approximations to Nyquist band-limited symbols with periodic zeros in the time response either side of one or more non-zero sample points, in order to control inter-symbol interference and to minimize the bandwidth occupied by the modulated data signal regardless of the available media bandwidth. Optimum demodulation is coherent and is accomplished by synchronous sampling of the amplitude of the received band-pass signal or of the base-band output of a linear demodulator, the timing usually being derived from some special property of the received signal.

Another example of a similar modulation technique is vestigial-sideband frequency modulation developed for data transmission. This earlier development recognized that FM signals can be demodulated without error even though significantly altered by a non-uniform amplitude response within the effective transmission bandwidth. This same principle has been taken to another extreme in a duobinary scheme showing full recovery of the data after allowing such severe inter-symbol interference to occur that more symbol states were employed than were required by the information content.

Recently simplified schemes of frequency and phase-modulation have been used for magnetic recording and for wire cable transmission. A modulation index of one-half is used for maximum data rates in the available two to three octaves of bandwidth, and the carrier is phase synchronized to the data clock. In the absence of spectral frequency translation in the magnetic medium or wire cable, the carrier and data remain synchronized and the clock and data can be easily recovered from the modulated wave.

The basic method for generating binary phase-modulated, binary signals commonly used in magnetic recording for data storage entails negative going zero crossing transitions in the center of each bit cell for "1" symbols and positive going for "0"s. Several methods exist for detection such as first identifying which of the transitions are the data transitions from an initial . . . 0101 . . . data sequence, then determining the direction of polarity change occurring at that transition. Clock regeneration is commonly done by phase and frequency control of a tunable oscillator within a feedback loop, comparing the average oscillator phase with a signal derived from the transitions of the received phase modulated wave.

The basic method for generating binary frequency-modulated binary waves such as for private cable communications employs a zero crossing transition at each bit cell boundary and either no transition at the center for a "0" or a transition for a "1" symbol. The resulting modulated wave is identical in form, bandwidth, and information rate as the phase modulated version, differing only in the relationship of symbols to the original data. The data, clock and carrier phases are again synchronized so that both clock and data can be readily extracted from the received wave. Initial bit synchronization is achieved again with a sequence of longer length symbols, FM data sequence of . . . 0000 . . . , for example, while the measurement of frequency is simplified to the measurement of the time between zero crossings. A "zero" data bit shall be defined as the signal consisting of one half cycle of a sine function with frequency equal to one-half the data and clock rate, while a "one" data bit is the signal consisting of two successive half cycles of sine function with a frequency equal exactly to the data rate.

Both the frequency and the phase-modulation schemes are simple to generate. The phase modulation scheme has a small advantage in ease of decoding the data after the clock transition is identified. The frequency modulation scheme has several advantages: it is insensitive to the polarity of the medium response;

the block bit intervals are always identified by a polarity transition; the signal can be decoded by measurement of polarity changes; that is, the time interval between transitions. It is generally not necessary to use AGC, peak detectors, threshold comparators, or other analog circuits in interpreting the data; there is no necessity to use controlled oscillators for clock tracking and regeneration, although tracking changes in clock timing can be done if the received timing varies significantly. Instead simple logic elements and networks may be used for time measurement and clock identification for overall simplification of decoding the received signal and clock. When a FM or PM signal is demodulated by measurement of the duration of half cycles of the wave, it can also be considered equivalently as a time-duration modulated wave.

There are two shortcomings of synchronous FM and PM, especially when a modulation index of one-half is selected to obtain a maximum data rate from binary modulation within an upper band limit. The first shortcoming results from the presence of significant spectral energy extending down to and approaching zero frequency, so that delay distortion and amplitude loss from the low-frequency cut-off of the bandpass media degrades the signal waveform. The second shortcoming concerns a receiver operating with only the polarity of the received signal and having difficulty in distinguishing whether or not a signal is present without also measuring the amplitude of the received signal and comparing it with a fixed threshold.

A solution to reducing the low frequency energy content might be to pass the signal through an intentional high-pass filter with a controlled cut-off above the media cut-off. However, in so doing, the zero-crossing pattern is disturbed and a synchronous FM or PM waveform is badly degraded. This is essentially what the "digital echo modulation" procedures accomplishes with more complex equipment to overcome the degradation.

SUMMARY OF THE INVENTION

According to one feature of this invention, sequences of digital bits are accepted and formatted so as to be compatible with the band pass characteristics of the media to be used. Each bit as received is interpreted so as to produce a pulse having a width between zero crossing transitions correlated to its binary significance and having an amplitude such that the hypothetical area encompassed by each half cycle between zero crossing transitions is substantially equal to all other such hypothetical half cycle areas regardless of the half cycle time duration. Further, each pulse is modified from a pure square wave into a pulse wherein the spectral content of the lower frequencies of the band pass of the media are substantially reduced. This result can be obtained by responding to each data bit by introducing predetermined control signals to a bipolar digital to analog converter. Although the desired waveform can be produced directly as the D/A converter output if desired, an arrangement not requiring complex D/A converter controls is possible by producing time division and amplitude modulated square waves at the D/A output and passing these square waves through an equalization filter to shift the spectral content prior to applying the waveform to the linear band-pass media. Thus the invention alters or shifts the waveform spectrum without altering the zero crossing content thereof. The waveform signals pass through the media so as to be insensitive to time changing gain variations of the media. The media can be magnetic tape, a communications link or the like.

Another feature of this invention involves generating pulses sometimes referred to herein as "no data" signals at a frequency distinct from the data and/or clock information frequencies. These "no data" signals are formatted using the same pulse width, amplitude modulation and spectral content shifting techniques as mentioned before so as to maintain substantially equal the hypothetical area of all half cycles regardless of frequency. The no data signals can be used to flag the beginning and/or end of variable length bit groups stored on or passing through the media. They can also effectively reduce sensitivity of the system to noise signals between data bit groups.

Accordingly, an object of the present invention is to provide a method and apparatus for improved usage of noisy band-pass media for digital data handling purposes.

Another object of this invention is to reduce sensitivity of a data storing or handling system to frequency limitations of the media.

A further object is to permit simplified recognition of the beginning and/or end of variable length data records.

A still further object is to apply digital data processing techniques to format waveforms so that magnetic recording apparatus designed for audio use can be applied to recording of digital information.

The foregoing and other objects, features and advantages of the present invention can be more fully understood from the following detailed description taken in conjunction with the accompanying drawings.

DETAILED DESCRIPTION

Figure 1:
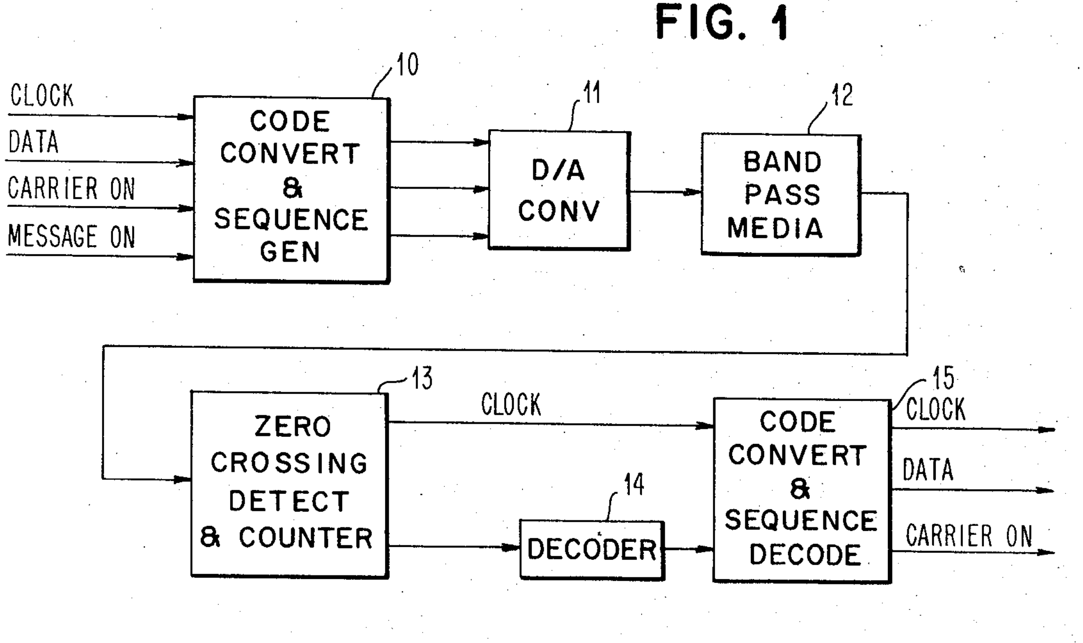
FIG. 1 is a block diagram of the elements involved in recording and retrieving digital data on or through a band pass media.

The present invention solves the problems associated with prior art data encoding techniques as discussed hereinbefore by deriving a new TDM, FM or PM signal which retains the desired pattern of polarity changes (zero crossings) but which has a reduced spectral content at low frequencies. A first way to accomplish this is to generate an auxiliary signal with a different, pre-distorted zero-crossing pattern which, after passing through a suitable high-pass filter changes to exhibit the desired zero-crossing pattern. This can be done by generating a sequence of cosine-function symbols for the FM case which are 90° lagging the original sine-function symbols, then passing this predistorted signal through a corresponding high-pass filter ith a constant 90° of phase lead and no time delay such as by a differentiator. The output of the high-pass filter is a sequence of half-cycle sine symbols as before, but where the amplitude of each symbol has been modulated by a function inversely proportional to the duration of each half-cycle sine symbol.

The envelope of the random data power spectrum has been altered by the differentiator amplitude response which is proportional to frequency, thus making not only the spectrum intensity but also its first derivative equal to zero at zero frequency. An important characteristic of this modified synchronous TDM signal is that each half cycle of the wave has an equal area, independent of the data sequence producing the modulation. Assuming that the low frequency cut-off of the media is several octaves below one-half the data rate, the impulse-response transient of the media will have a duration considerably longer and at a slower oscillation frequency, if any, than any half cycle of the time-duration modulated wave. Therefore, by controlling the area of each half cycle, the inter-symbol interference transient following each half cycle of a modulated wave summed by superposition on a half-cycle-by-half-cycle basis can be made to cancel that of the sum of all the previous half cycles even though there are no periodic zeros in the transient wave.

Herein lies the novel basic principle of the improved TDM scheme. Since the wave is detected by observation of the time interval between zero crossings, a Nyquist impulse response with periodic zeros everywhere except one would be unsuitable since the zeros of the composite wave will not occur at the periodically spaced Nyquist sampling points of the symbols. Instead, new symbols must be defined consisting of one half cycle of a sine function whose duration (or frequency) is modulated, and whose transient behavior imposed by the storage or transmission medium during and following each half cycle symbol cancels as much as possible the sum of all the previous symbol transients, whatever waveform they may have. In addition, the half-cycle symbol must terminate and pass through zero with maximum possible and uniform slope independent of the time duration of the half-cycle symbol.

The criteria for defining a set of time-duration modulation symbols can be summarized:

1. Each symbol consists of an integral number of half cycles of a wave, always alternating in polarity.
2. The area of the half cycles are all substantially equal, or adjusted for optimum cancellation of inter-symbol interference if the typical storage or transmissions media response is known.
3. Fixed equalization of the typical media response is determined to obtain maximum and uniform slope of the wave at the end of each half-cycle; the equalization may affect the optimum half-cycle area of the symbols.

FIG. 2E shows an example of a time-duration modulation with three symbols useful for data storage on magnetic tape. For obtaining maximum performance with magnetic media, it should be understood that a high-frequency sinusoidal bias signal is added to the record signal to linearize the response of the magnetic media, and that appropriate equalization networks can be included to achieve maximum usable media bandwidth. The AC bias and record-playback equalization are commonly used for analog recording in combination with a separate erase device, but not generally for data storage where saturated, self-erasing recording is common.

The various symbol amplitudes can be generated directly for each of the three durations of half-cycles with a digital-to-analog converter such as D/A 11 of FIG. 1, once they have been determined in relation to the fixed equalization and combined record-playback response of the magnetic tape. In general, the symbol amplitudes are optimized with a constant of proportionality $k$, $$A_i = k\ (Ao\ To/T_i)$$

where $k$ is about 0.75; $Ao$ and $To$ are the amplitude and duration, respectively, of a reference half-cycle symbol; and $A_i$ and $T_i$ are the amplitude and duration of the $i$-th symbol. The equalization is generally optimized to reduce the magnitude of the tail of the system impulse response to a minimum amplitude, and to make the time delay as uniform as is easily achieved.

The amplitude modulation and equalization combined with the time duration modulation of half cycles of an alternating signal can produce a signal reproduced from magnetic tape whose time intervals between adjacent polarity changes have means or averages equal to the generated time durations, and have standard deviations of one tenth of the mean or less, and are capable of yielding bit error rates less than one error in 100,000,000 bits. This performance level has been achieved with voice-grade cassette equipment operating at 1 ⅞ inches per second tape speed, 0.050 inch tape track width, 0.0001 inch head gap in contact with tape, and 1,670 bits per inch data density.

It has also been achieved over 6,000 feet of standard RG 62/V coaxial cable with 2,500,000 bits per second being transmitted.

The second shortcoming mentioned earlier as existing previously in the art concerned the identification of the presence or absence of intentional FM, PM, or TDM data as seen at a receiver operating entirely on the polarity, polarity changes, or zero-crossings of the received signal. In the absence of an intentional signal, the system noise is detected as polarity changes with the possibility that a random sequence of noise will be falsely interpreted as data. A further improvement applicable to FM, PM, or TDM systems involves the addition of another symbol to the coding of the data to signal the start and end of messages, along with a defined sequence of the various available symbol times being required before the receiver initiates the beginning of a received data message.

The additional symbol has been indicated by example in FIG. 2E as a long duration or low frequency half-cycle whose symbol duration may exceed or be a multiple of the data clock time used during the message. This third symbol can be used and recorded continuously on magnetic tape inbetween records, or it can have a small number of half-cycles mixed with a certain sequence of all the other assigned half-cycle durations to act as a key on the beginning of a message. A very high degree of discrimination can be achieved against either impulse-type noise, steady-state sinusoidal interference of any frequency, and against random noise if at least three different symbol time durations are contained in the initial sequence key.

The elements involved in implementing this invention are shown in block form in FIG. 1. A typical application of this embodiment is to accept control signals Clock, Data, Carrier On and Message On from a data processing or handling type of device so as to permit digital data recording in a recoverable manner on band pass media 12. Media 12 can be a relatively low cost magnetic tape used in a state-of-the-art audio cassette recorder as sold for home entertainment purposes. The data is recorded on a single track and thus must be self-clocking. The difficulty with a media such as this is that it is band pass limited so that low and high frequency spectral distortion causes loss of data. Additionally, this media tends to be noisy and it fluctuates in gain or overall response. The embodiments shown produce recording waveforms having a shifted frequency band for the data by combining time division and amplitude modulation.

In FIG. 1, logic circuitry 10 receives a continuous stream of clock pulses but, with no other input, no output is produced. As soon as a combination of Message On and Carrier On inputs are provided, code converter and sequence generator 10 produces a binary combination on its three output lines so as to provide an input to digital to analog converter 11 to cause it to raise its output as shown at E in FIG. 2. This particular combination of output from 10 will be held for the equivalent of four clock cycles for the first half cycle pulse 20. The combination is then switched by 10 so that the reverse polarity is produced for four more clock cycles. This provides low frequency "no data" signals 20 and 21 which are of relatively low amplitude but which actually results in recording of intelligent information on the band pass media 12 which is assumed to be a low cost tape cassette in this example.

Even though "carrier on" and the clock signals are present, logic 10 will ignore any signals on the data line until the "message on" input is provided. When the "message on" input appears, logic 10 will then inspect the condition of the data line. As shown at FIG. 2D, the first data bit input is a "0." Logic 10 recognizes this as requiring another 3 bit combination for an input to D/A 11 with D/A 11 responding by producing a reversed polarity and increased amplitude output as shown at 22 in FIG. 2E. The half cycle which corresponds to a complete "zero" is terminated by 10 after two complete clock cycles. The second "zero" causes 10 to produce yet another binary sequence to provide D/A 11 input so that an output of opposite polarity but equal magnitude as compared to the first "zero" is produced, this being pulse 23.

Ultimately the data input indcates that a "1" is to be recorded. Logic 10 responds by producing two additional sequences of 3 bit inputs to D/A 11 so that one complete cycle covering two clock cycles is provided as a recording input to 12. This complete clock cycle for a "1" is shown as pulses 24 and 25 in FIG. 2E. Note that the amplitude for the recorded signal for the "1" is greater than either the "0" or no data cycles. However, the areas encompassed by pulses 20 – 25 are all substantially the same.

Figure 3:
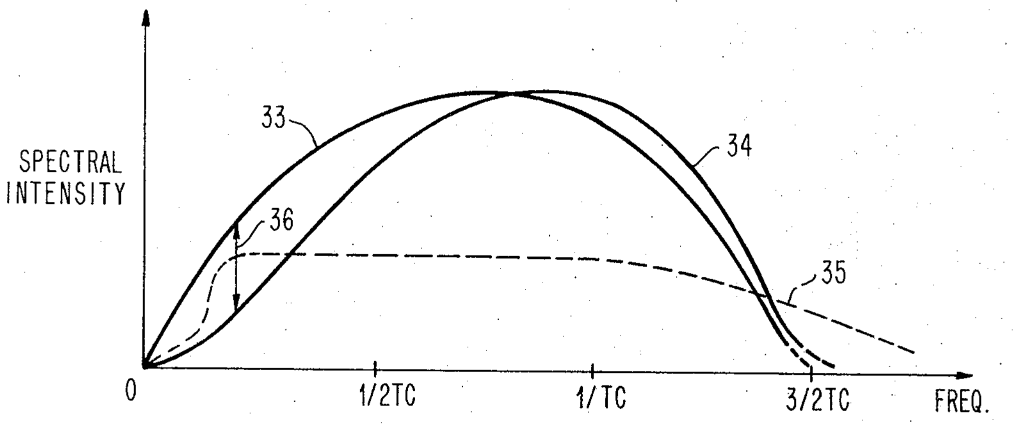
FIG. 3 graphically presents plots of spectral content against frequency.
Figure 4:
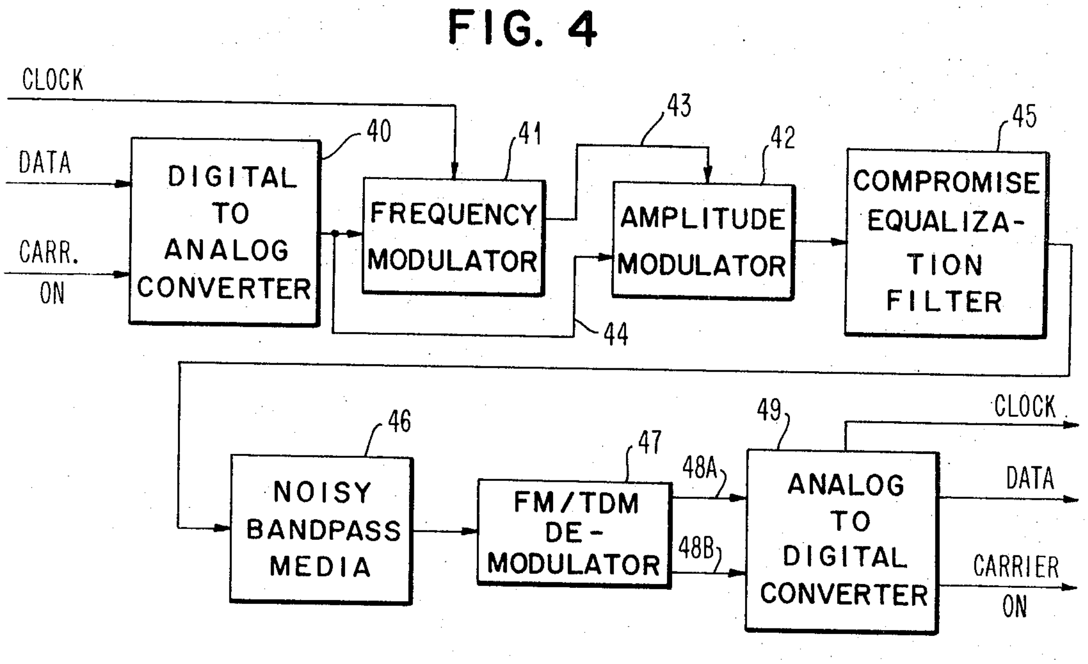
FIG. 4 illustrates another embodiment of this invention in block form.

The end result as seen by the recorded data when read back from media 12 is that the area under each curve for positive and negative transitions is substantially the same as between any two consecutive half cycles regardless of the recording frequency. Note also that a "compromise equalization filter" coupled between the D/A converter 11 and the media 12 can be used as is shown in FIG. 4 at 45 and FIG. 5 at 53. This filter is a passive element which can be used to restore the actual bandwidth to a more idealized case. That is, after the appropriately modulated signal has been produced through D/A 11, the filter can then be included to increase the low frequency response at the expense of a slight degradation of high frequency response thereby restoring the more ideal bandwidth features as is shown in FIG. 3 for the spectral intensity of random data sequences plotted against frequency. However, this invention includes both the case of employing an equalization filter, and also the case of omitting it and optimizing the response by control of the amplitude constant of proportionality, $k$, defined earlier.

By this recording operation, the intelligence is contained in the zero crossing information at the output of media 12. Zero crossing detector and counter 13 responds to each zero crossing by beginning to increment its internal counter from its own internal clock. Each time a zero crossing is detected, decoder 14 inspects the count and provides an input to code converter and sequence decoder 15 which permits logical interpretation of the events which have preceded the zero crossing most recently detected. That is, code converter 15 will inspect the output of detector 14 in conjunction with zero crossing correlated clock signals from 13. The output of decoder 14 will reflect the time between transitions which will differ for zero and 1 bits. If decoder 14 output shows that the zero crossing occurred at less than three-fourths of two clock cycles, logic 15 recognizes that half of a "1" cycle has occurred and that a logical "1" should be stored. Logic 15 further recognizes that an additional half cycle of a "1" must be detected by 14 before that data bit detection is completed. Conversely, logic 15 recognizes a zero crossing transition that has occurred at a time greater than three-fourths of two complete clock cycles but less than one and a half times two complete clock cycles is a logical 0. Logic 15 can further include means for interpreting data crossing detection from 14 which occurs at greater than one and a half times two clock cycles but less than three times two clock cycles as representing a valid "no data" half cycle. Logic 15 further can recognize a time duration between zero crossings which is greater than three times two clock cycles as a time-out condition due to the absence of a transmitted symbol, or due to low frequency noise. Logic 15 can then also be used to buffer bytes of data for providing further output shown as Clock, Data and Carrier On signals to other data processing equipments.

The use of the "no data" recorded signals followed by two sequential zeros and a "1" will produce a sequence of three complete cycles at increasing frequencies in a regular progression. The probability of such an exact progression being simulated by noise is unlikely to the extent that this sequence can be used to detect the beginning of message. End of message could be recorded in the reverse sequence or in the same sequence followed by "no data" patterns if bidirectional data reading is to be employed. However, a simple shift from the 0 and 1 patterns to a "no data" pattern generally would be sufficient for this record or message ending flag. The use of recorded cycles of low frequency "no data" signals is particularly advantageous in that it effectively biases the recording media and further reduces the possibility of random noise being present thereon.

Figure 5:
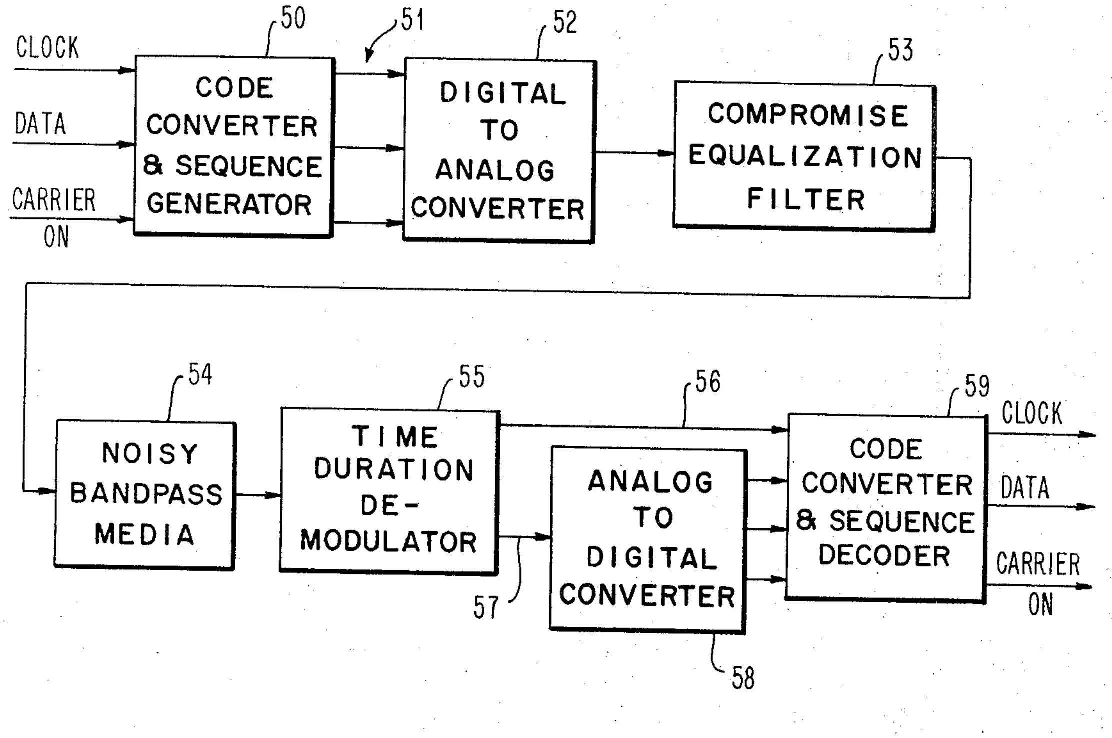
FIG. 5 depicts still another embodiment of this invention in block form.

The result of using an equalization filter 45 in FIG. 4 or 53 in FIG. 5 as mentioned previously is shown in the waveform of FIG. 2G as the typical "equalized" waveform. This waveform could be reproduced using D/A techniques if desired but the additional complexity for such circuitry and its controls appears generally less attractive since the filter can provide this function using well-known techniques and passive elements. Further, logic 15 can include circuitry for responding to apparent error conditions at the output of 14 in any desired manner. For instance, if the zero crossing detector indicates that only one-half of a "1" cycle has been detected and is immediately followed by a "0" detection, logic 15 can either immediately indicate an error exists or can be arranged to assume that the subsequent "0" is actually the second half of the "1" cycle.

Although the preferred embodiments are shown and described in terms of a time division modulation scheme, they can likewise be employed in a phase encoded arrangement wherein the significance of data is reflected by the direction of transition at the zero crossing. The phase encoding technique does not employ zero crossing transitions at each data cell boundary as is used in time division modulation or double frequency recording. This only means that the detection circuitry must be capable of providing an indication of the direction of transition at zero crossings. The invention is clearly applicable to the binary frequency or double frequency encoding schemes. The invention is not limited to single track recording but is equally applicable to multi-track recording.

It should be noted that the FIG. 1 system when operating with a cassette recorder could also include at least one control line (not shown) for starting and stopping the tape drive motor. This is relatively easy to implement since most state-of-the-art cassette recorders include connections to permit introduction of external power. Further, the interfaces available on existing process control computer systems include selectable output power connections suitable for this purpose.

FIG. 3 shows graphically the result of shifting the low frequency spectral content of the signals represented by the data to be recorded. It is a plot of the spectral intensity of random sequences of "0" and "1" data symbols compared to frequency expressed in terms of the period Tc of two clock cycles, or the reciprocal of the data rate. That is:

$$\text{Modulation Index} = \text{Peak Carrier Deviation/Modulation Bandwidth} = \tfrac{1}{4}\,Tc/\tfrac{1}{2}\,Tc = \tfrac{1}{2}$$

The conventional FM-PM response curve is shown at 33 while the typical three octave band pass response of the medium is shown at 35. Curve 34 illustrates the spectral content shift in accordance with this invention wherein increment 36 reflects the reduction in low frequency spectral content so that the low frequency content is compatible with the low end of the band pass curve 35 for the medium.

FIG. 4 is a block diagram of another embodiment of this invention wherein the improved time duration is employed with combined FM/AM generation of the transmitted signal and with generation of an additional symbol for signalling "carrier on." In FIG. 4, digital to analog converter 40 receives binary bits on the data input line corresponding to the data to be recorded or transmitted and is enabled whenever the Carrier On input to D/A 40 is present. Thus D/A 40 has four potential output levels corresponding to "carrier off" (which is the zero level), no data, zero or one. The clock input to frequency modulator 41 is effectively an FM carrier equivalent which carrier is then frequency modulated as a function of the D/A 40 output level. The output 43 of frequency modulator 41 then becomes the equivalent of an AM carrier input for amplitude modulator 42 which amplitude modulates the signals on line 43 as a function of the level of D/A 40 via line 44. The resultant output of modulator 42 is the same as that shown in FIG. 2E or it may have a sinusoidal carrier waveform similar to that shown as a media output in FIG. 2F. The compromise equalization filter 45 shifts the spectral content so as to produce an input to the linear noise bandpass media 46 as is shown in FIG. 2G. The frequency-modulation or time-duration modulation demodulator 47 interprets the signals received from media 46 as illustrated in FIG. 2F to produce clock timing pulses on output 48A and a three level analog signal (or four level if the zero level is taken into account) on line 48B. The analog to digital converter 49 responds to inputs 48A and 48B to place the intelligence contained therein into a format compatible with a digital data processing system. The output of ADC 49 includes timing clock pulses, data which can be single bits or accumulated bytes and a line level to indicate that the carrier is present.

Figure 2:
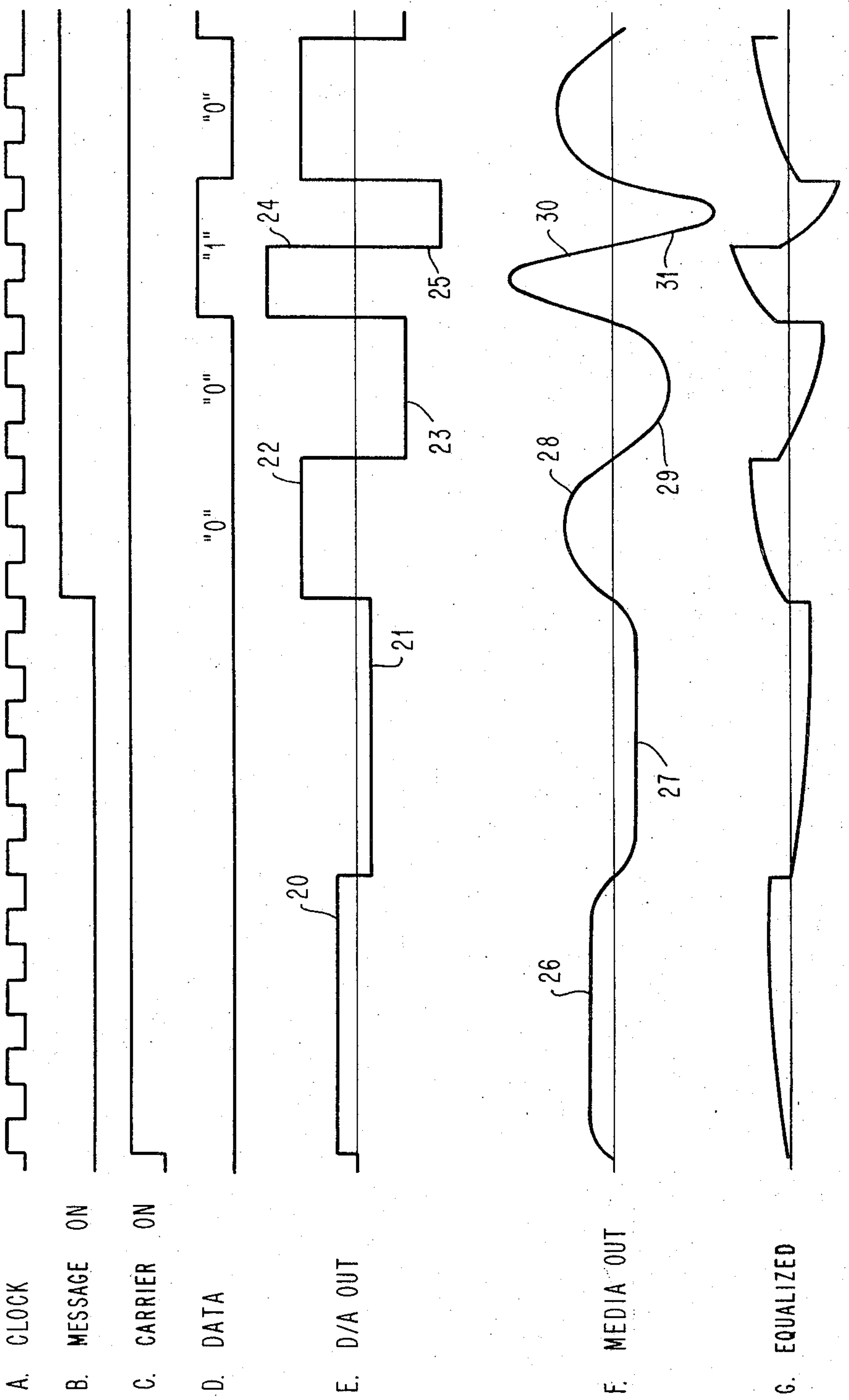
FIG. 2 shows typical operating waveforms for the preferred embodiments of this invention.

FIG. 5 shows another embodiment for improved time duration modulation with direct synthesis of an FM/AM transmit signal and with an additional symbol for signalling "carrier on." Although only Clock, Data and Carrier On inputs are shown for code converter and sequence generator 50, it should be appreciated that a Message On input to 50 can also be provided so that the four inputs of FIG. 2 A-D apply to FIG. 5. Circuit 50 includes logic to interpret the states of its inputs so as to provide three binary signals 51 as inputs to bipolar digital to analog converter 52. D/A 52 responds by producing the seven output levels (including zero level) required to produce the waveform shown in FIG. 2E. The operation is thus similar to FIG. 1 in that nothing happens until Carrier On appears at which time "no data" pulses are recorded until Message On appears. Alternatively, logic 50 can respond to the presence of clock pulses and absence of a Carrier On input by continuously producing the "no data" combinations for D/A 52 provided means are included to ensure that a "no data" cycle is completed prior to initiating a record or block of zeros and ones after Carrier On does appear. Compromise Equalization Filter 53 modifies this waveform as shown at FIG. 2G for recording on or passage through noisy bandpass media 54.

Time duration demodulator 55 includes a continuously incrementing counter which, each time a zero crossing transition (FIG. 2F) is detected, strobes out an analog level proportional to the time duration lapsed since the last zero crossing transition. These levels are then converted to digital form via ADC 58. Code converter and sequence decoder logic 59 is synchronized by clock timing pulses from demodulator 55 via line 56 to interpret the digital output from ADC 58. If a clock timing pulse on line 56 is accompanied by a character on ADC 58 output designating that a no data pulse is present, then logic circuit 59 produces no output. However, if the start of message sequence is being used, logic 59 then remains conditioned to inspect the next pulse width for a "0." A correct sequence of two no data pulses, two zeros and a one (20–25 of FIG. 2E) causes logic 59 to discard that particular data but to be conditioned to raise its Carrier On output line and to begin accumulating data to strobe out over the Clock and Data output lines. Whenever a first half cycle of a "1" bit (such as pulse 24 of FIG. 2E) is detected by logic 59, it will immediately store or strobe out a "1" data bit but will also be conditioned to inspect the next pulse to ensure that it is another "1" half cycle such as pulse 25 of FIG. 2E. If it is, then it is ignored but logic 59 remains conditioned to extract data from the next pulse. If not, logic 59 can respond in any desired manner such as by raising an error indicating signal as an output or by assuming the next pulse really was the second "1" half cycle. Logic 59 can also be arranged to recognize the next "no data" pulse after a correct start of message sequence as an end of message flag. Thus the circuitry in accordance with this invention can readily accept any record length and without prearranged record formatting.

Figure 6:
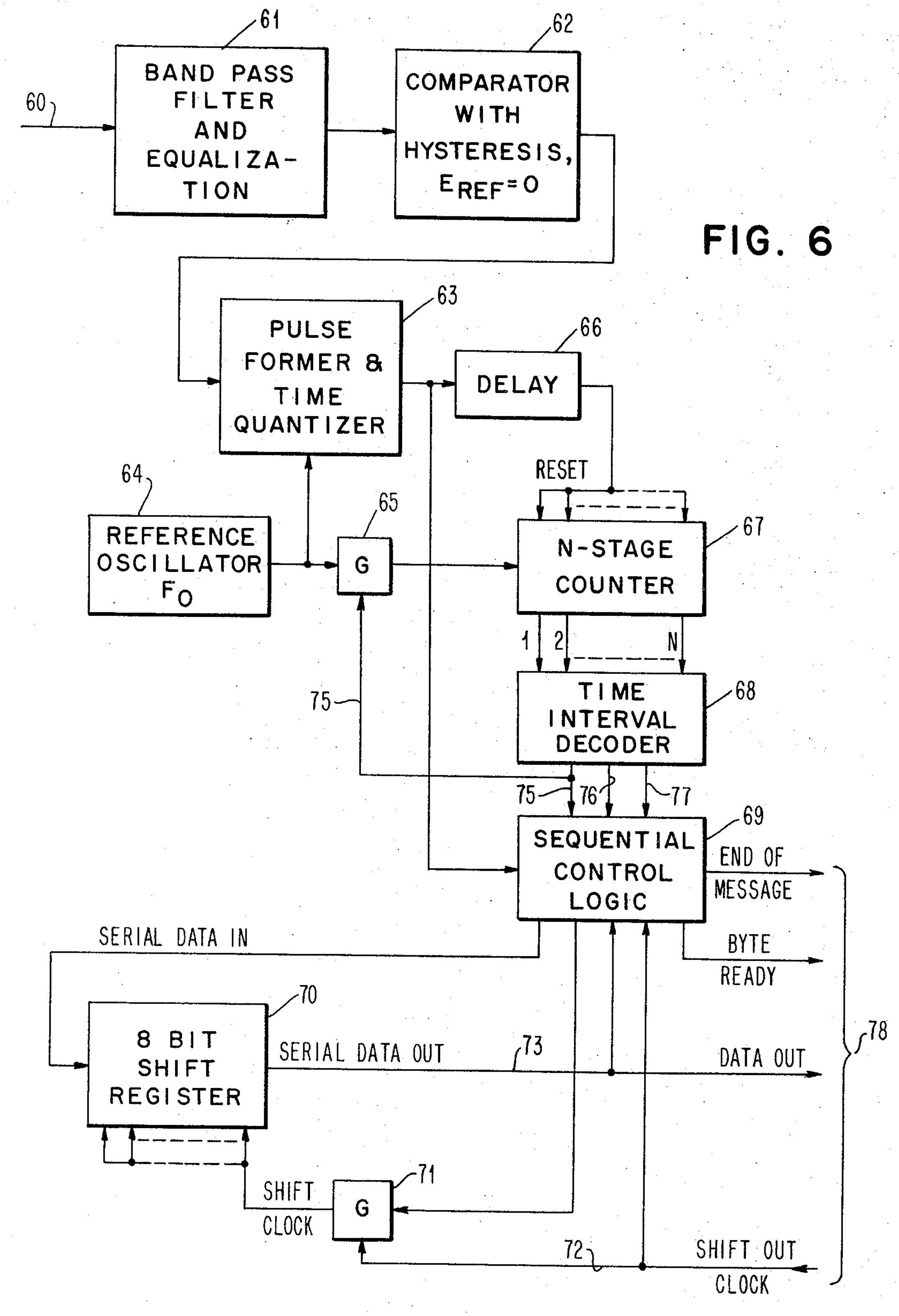
FIG. 6 is a block diagram of circuitry which can be used to recover information from a stream of pulses from a noisy band-pass media.

FIG. 6 shows circuitry for extracting data from the waveform received or recovered from the media and represents a more detailed embodiment of the zero crossing detect and counter 13, decoder 14, and code converter and sequence decoder 15 of FIG. 1, the demodulator 47 and ADC 49 of FIG. 4, or of the demodulator 55, ADC 58, and decoder 59 of FIG. 5. The media waveform as shown in FIG. 2F is introduced to input 60. Bandpass filter and equalization circuit 61 limits the receiver noise bandwidth and provides additional equalization as required, and then drives comparator 62. Comparator 62 employs hysteresis characteristics to reconstruct a binary-amplitude version of the waveform zero-crossing transitions of FIG. 2E.

The pulse former circuit of 63 changes the wave to a short return-to-zero pulse indicating each zero-crossing transition independent of the original direction of the transition, while the time quantizer delays the pulse until it coincides with and is synchronized to the reference oscillator 64. The reference oscillator Fo runs at a significantly higher frequency than the magnitude of the data rate, $1/Tc$:

$$Fo >> 1/Tc$$

The pulse output of 63 is delayed by 66 and then is used to reset a counter 67 incremented by the reference oscillator 64 through gate 65. Thus at each input signal zero crossing the counter is reset and then allowed immediately to start counting oscillator cycles. As the count increases, a time interval decoder 68 continuously categorizes the state of the counter into defined time ranges. These ranges are set to separate the time-duration modulated zero crossings into the four categories previously defined:

0 < one half of a data "1" (77) < ¾ Tc ¾ $Tc$ < a data "0" (77) < 3/2 Tc 3/2 $Tc$ < a "no data" (76) < 3/ Tc
3/Tc < a "time out" (75) < infinity Thus the logical states of the three lines 75, 76, 77 are sampled at the next pulse output of 63 to determine the information content of the time duration interval, and then they are strobed to sequential control logic 69 after which the counter is reset and the next time interval is begun. Sequential control logic 69 is set to decode the initial message key, such as the sequence of two "no data," two "0," and a "1" pulses as shown in FIG. 2E. Logic 69 will then decode data sequences of "0" and "1" and load them into register 70. In this embodiment, after each 8 data bits are loaded serially into 70, a "byte ready" signal is generated by 69 over the interface 78, requesting service. The machine then delivers 8 shift pulses on line 72 thru "or" gate 71 to serially read out the register 70 on line 73 at a high rate. This causes the "byte ready" line to drop until another 8 bits has been loaded into register 70 from the sequential control logic circouit 69. When a "no data" symbol or an end of message key is detected, it is indicated on the "end of message" line of interface 78, signalling completion of the data transmission or record.

As mentioned, this invention makes it possible to record digital data on a state-of-the-art audio cassette recorder under computer control so that this data can be detected and loaded into another (or the originating) computer. For instance, an IBM System/7 computer via the digital output capability thereof can be used to provide the Clock, Data, Carrier On and Message On signals as well as the cassette recorder power. The cassette recorder can be an unmodified Norelco Model 1420 or Model 150 or equivalent with batteries removed, with power and on-off control being provided by the computer. By setting the recorder controls for writing and coupling the appropriate System/7 digital output points to the power connection and the modulated outputs shown herein to the write connections, the desired patterns are recorded serially on the tape. This tape can be stored and used to load information into a computer by connecting the detecting and interpreting circuitry shown in this application via cable connections to the recorder read terminals, the recorder controls now being set for playback.

Figure 7:
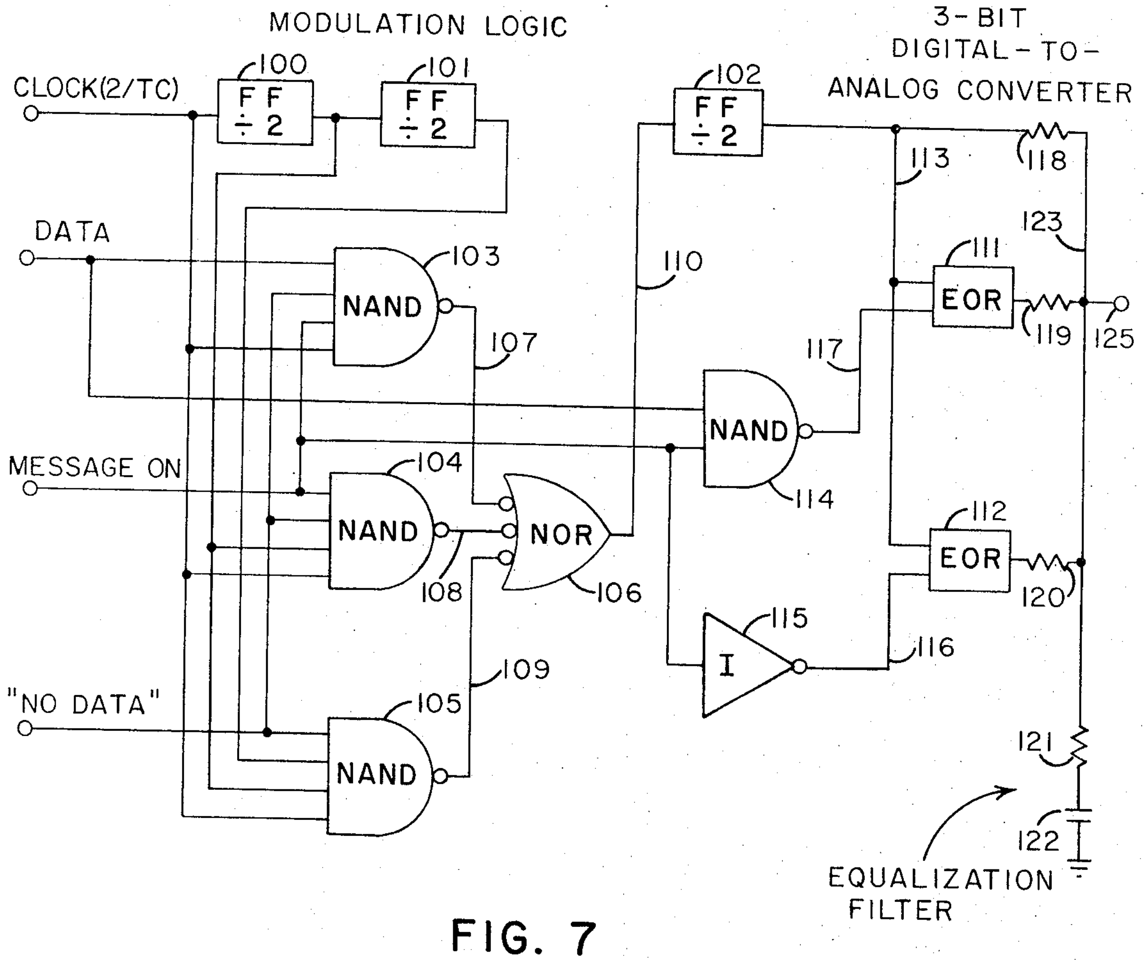
FIG. 7 presents detailed circuitry for developing an appropriate waveform for introduction to a media in accordance with the present invention.
Figure 8:
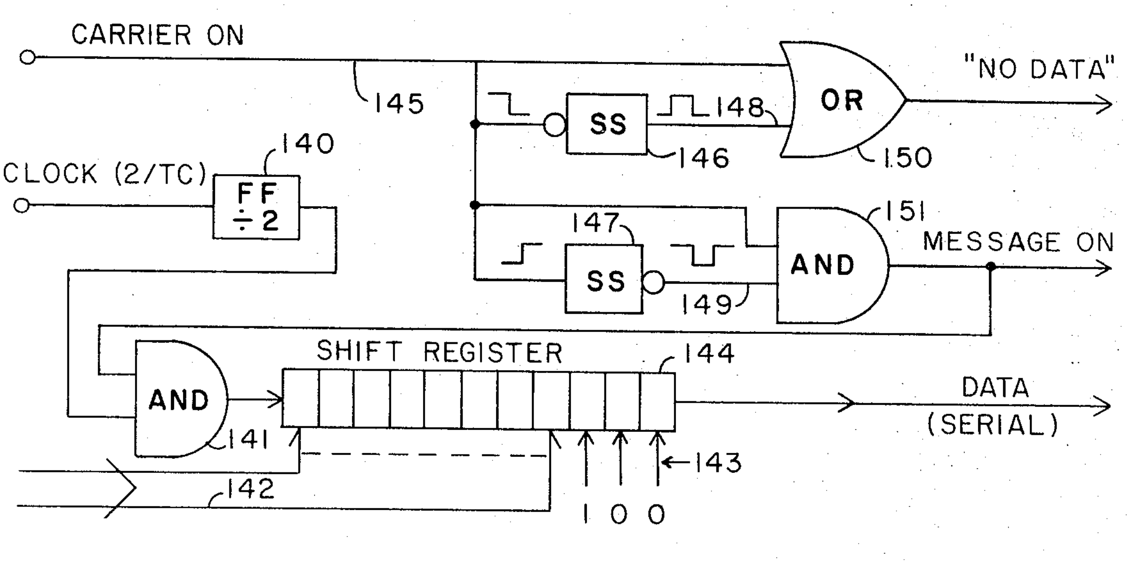
FIG. 8 is detailed circuitry for generating preambles and postambles to data records.

The detailed circuitry of FIG. 7 shows an embodiment of the code converter portion of 50, the digital-to-analog converter 53 and the compromise equalization filter 53 of FIG. 5. The remaining sequence generator of 50 is shown in FIG. 8 which along with timing diagram FIG. 9 sets forth an embodiment of an arrangement for generating a message preamble 160 and postamble 161 of "no data" symbols, and a character preamble of "001" data symbols used also as part of a message preamble.

In FIG. 7, the Clock line runs at a frequency equal to twice the data rate as shown by line A of FIG. 2. The clock is frequency divided by two by flip-flops 100 and 101, providing symmetrical squarewave signals at the data rate and at one-half the data rate. If the "No Data" input is energized, NAND gate 105 decodes every fourth clock pulse and via line 109 drives through NOR gate 106 to another flip-flop 102, producing a symmetrical squarewave at line 113. Flip-flop 102 and exclusive OR gates 111 and 112 provide three modulated binary signals to the three bit digital-to-analog converter comprised of weighting resistors 118, 119, and 120. The summed output 123 of the DAC resistors is further altered by equalization filter components 121 and 122 to produce an equalized voltage waveform 123 which is shown in FIG. 2G.

The frequency of the "No Data" symbols is then one-eighth of the input clock on line 113, and the input signals 117 and 116 to the exclusive OR gates causes the resistors 119 and 120 to drive currents in opposition to that of resistor 118. This results in small amplitude output changes to correspond to long-duration "No Data" symbols.

When the Message On input of FIG. 7 is energized, NAND 104 can decode every other clock pulse to drive NOR 106 and flip-flop 102 producing a frequency at 113 equal to one-fourth of that of the input clock. The input to exclusive OR 112 now causes its output to be in phase with 113, providing currents from resistors 118 and 120 to be in phase and the current from 119 remaining out of phase. The resulting amplitude changes at 123 are now larger, corresponding to the input data "zero" state.

When both Message On and the data line is energized, NAND 103 passes every clock pulse to NOR 106 and flip-flop 102, producing an output frequency at 113 equal to one-half that of the input clock. All resistor currents are now in phase with each other, producing maximum amplitude voltage changes at output 123 corresponding to the input data "one" state.

Figure 9:
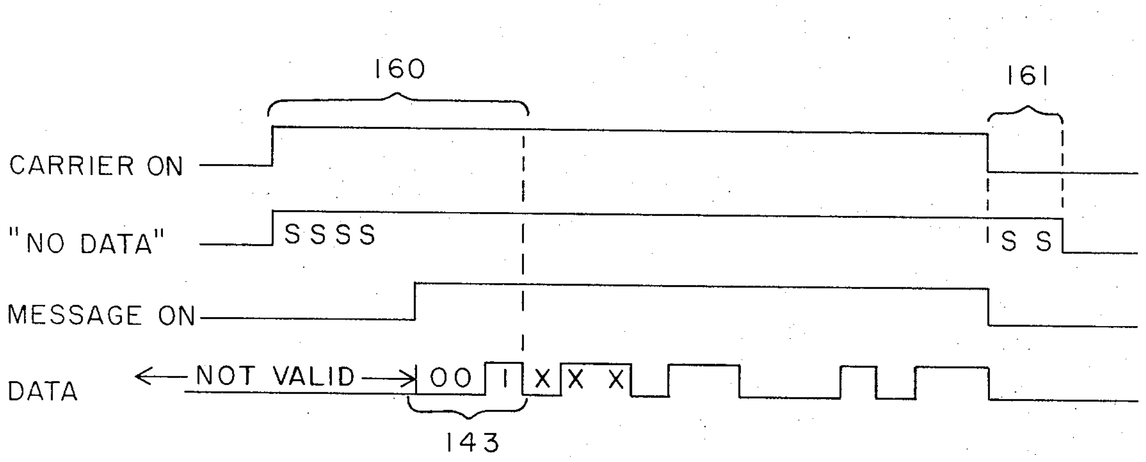
FIG. 9 is a timing diagram for FIGS. 7 and 8.

The circuitry of FIG. 8 shows a time delay element such as a single-shot 147 and an AND gate 151 delaying the "Message On" signal after an input Carrier On signal occurs to initiate the beginning of a data message or record. This provides time for the "No Data" line to signal the generation of a sequence of "No Data" symbols prior to the time the first data character or bits are serialized into the modulator. In the example of FIG. 8 and 9, a preamble 143 of data bits "001" is placed in front of each character by loading such a fixed pattern into the first 3 bits 143 of the serializing register 144 before shifting out each data character under command of clock gate 141. The shift register 144 is shown loaded in parallel fashion via cable 142 from a data source as is conventional. As shown, the 001 preamble sequence 143 will always be loaded into register 144 each time a byte of data is accepted from line 142. However, if it is desired to only generate the 001 preamble portion 143 once, the FIG. 8 circuitry can be easily modified to gate out the 001 sequence from a separate register at the beginning of a data record composed of a series of bytes loaded into register 144. This would have the advantage of making available more data bits in a given record and is possible since the 001 preamble is only necessary at the beginning of the record. However, additional circuitry including logic for recognizing that the 001 sequence is needed would have to be included in addition to the separately gated 001 source.

In any event, note that the last two "No Data" half cycles of message preamble 160 (shown as "S—S" in FIG. 9) and the 001 sequence correspond to the preamble sequence of pulses 20 – 25 shown in FIG. 2E. It should be further noted that the sequential loading of bytes into register 144 from a data processor or handler type source can be controlled by any of several well-known techniques.

At the end of a message, Carrier On is dropped, while a timing delay element such as single shot 146 sustains the "No Data" line after Message On is dropped, thus providing for the writing of a sequence 161 of "No Data" symbols (shown as "S—S" in FIG. 9) as a postamble at the end of the message. After single shot 146 times out, all lines are deenergized, and the message or record is completed by using a computer. Accordingly, by using a computer to provide the Carrier On, Clock and parallel data sequences of characters for FIG. 8 and the outputs of FIG. 8 as inputs for FIG. 7, an appropriate recording waveform can be produced at output 125 of FIG. 7 for recording on or transmission through a media. In one embodiment of this invention, it was found that satisfactory operation for recording on a cassette magnetic recorder could be obtained with resistor 118 at 12 K ohms, resistors 119 and 120 both at 48 K ohms, resistor 131 at 3.3 K ohms and capacitor 122 at 0.002 ufd.

While the novel features and aspects of this invention have been shown and described in detail with reference to the preferred embodiments thereof, it will be understood by those having normal skill in the art that many changes in form and detail other than or in addition to those mentioned herein may be made without departing from the scope and spirit of the invention.

What is claimed is:

1. A system for time division recording onto or transmitting through a band pass media comprising means for receiving a train of data bits, logic means for converting said bits into a sequence of binary signal pulses at first and second frequencies correlated to the binary state of the bits of said train, means responsive to said binary signal pulses for producing an output waveform amplitude modulated as an inverse function of the time spacing of the encoding of the original bits so that the areas represented by time based excursions on either side of an average level are substantially the same between consecutive pulses despite frequency differences therebetween, means for introducing said output waveform to said media, and means for altering said output waveform so that the signal energy thereof introduced to said media is not dependent upon the direct current response characteristics of said media.

2. Apparatus in accordance with claim 1 wherein the said binary signal sequence is produced by said converting logic means with a frequency spectral content shifted so as to conform to the frequency spectrum of said band pass media.

3. Apparatus in accordance with claim 1 wherein said binary signal responsive means includes a digital to analog converter and wherein said introducing means further includes a filter coupled to receive said digital to analog converter output for altering the signal characteristics thereof so as to conform to the linear response characteristics of said band pass media.

4. Apparatus in accordance with claim 1 wherein said logic means further includes means operable in the absence of said data bits for producing pulses at a third frequency detectably separated from said first and second frequencies but within the frequency spectrum of said band pass media, whereby potential adverse effects from transient or noise signals associated with said media are reduced by the presence of said third frequency signals during periods without significant digital data.

5. A system for time division recording onto or transmitting through a band pass media comprising means for receiving a train of data bits to be recorded, for producing analog output signals having levels correlated to the binary significance of said data bits,
a source of clock pulses,
means for frequency modulating said clock pulses in accordance with said analog signal levels,
means for amplitude modulating said frequency modulated pulses in accordance with said analog signal levels for producing an output waveform wherein the area defined by excursions on either side of an average level are substantially the same regardless of frequency differences between pulses,
means for shifting the frequency spectral content of said waveform into conformity with the band pass characteristics of said media, and
means for introducing said shifted waveform to said band pass media,
whereby significant intelligence can be recovered from said waveform after recovery from said media despite the presence of noise associated with said media and without loss of intelligence from frequency and amplitude limitations of said media.

6. A system for time division recording onto or through a band pass media comprising
control signal generating means for providing a sequence of clock pulses, a first enabling signal and a train of signals containing binary data,
logic means responsive to said first enabling signal and said clock pulses for producing a sequence of a multi-bit digital output signals corresponding to said binary data signals, said logic means holding said digital output signals for time periods corresponding to the binary significance of said binary data,
digital to analog converter means responsive to said multi-bit digital output signals for providing an output having amplitude excursions in inverse correlation to the said time periods said digital output signals are held by said logic means, and
means for coupling said converter means output to said media,
whereby binary intelligence can be recovered from said media by interpreting the zero crossing transition timings with maximum cancellation of noise or transient signals associated with said media.

7. A system in accordance with claim 6 wherein said converter means output coupling means includes
means for shifting the frequency spectral content of said converter means output for providing signals to said media having frequency characteristics in substantial conformity to the band pass characteristics of said media,
whereby data will not be lost from recovery on or passage through said media because of frequency content thereof outside of the cutoff characteristics of said media.

8. A system in accordance with claim 6 wherein
said control means further provides a second enabling signal,
said logic means being responsive to the presence of said first and second enabling signals for producing said multi-bit digital output signals at first and second frequencies corresponding to the binary significance of said train of data signals,
said logic means being responsive to the absence of said first enabling signal and the presence of said second enabling signal for producing said multi-bit digital output signals at a third frequency different from said first and second frequencies,
whereby said third frequency signals will reduce potential adverse effects of noise signals from said media and can be recognized upon recovery from said media as not representing data of binary significance.

9. In a system for recording data upon or passing data through a media wherein data is significant as a function of a first or second frequency with the time-based excursions on either side of an average level defining substantially constant areas regardless of frequency, the improvement comprising
means for generating a third frequency lower than either said first or second frequency but with time-based excursions on either side of an average level defining substantially constant areas as for said first or second frequencies,
means for generating a preamble composed of one complete cycle of said first, second and third frequencies in a sequence of increasing frequency, and
means for introducing said preamble sequence to said media immediately prior to said significant data,
whereby said sequence can be recognized when received from said media as being a valid introduction to a data record which could not be simulated by random noise or data crosstalk from another source.

10. In a system for recording data upon or passing data through a media wherein data is significant as a function of a first or second frequency with the time-based excursions on either side of an average level defining substantially constant areas regardless of frequency, the improvement comprising
means for generating a third frequency lower than either said first or second frequency but with time-based excursions on either side of an average level defining substantially constant areas as for said first or second frequencies, and
means for introducing at least one cycle of said third frequency to said media immediately following a record of one or more data signals of said first and second frequencies for providing a postamble for said record.

11. In a system for recording data upon or passing data through a media wherein data is significant as a function of a first or second frequency with the time-based excursions on either side of an average level defining substantially constant areas regardless of frequency and wherein multiple records of one or more data signals in said first and second frequencies are periodically recorded upon or transmitted through said media with gaps therebetween during which no data is present, an improvement comprising
means for generating a third frequency lower than either said first or second frequency but with time-based excursions on either side of an average level defining substantially constant areas as for said first or second frequencies, and
means for introducing said third frequency signals to said media during all said gaps and including means for introducing a preamble sequence having at least one cycle of said third frequency signals to said media immediately prior to said significant data,
whereby data simulating noise or transient signals during said gaps can be suppressed.

* * * * *